(12) United States Patent
Allen et al.

(10) Patent No.: US 7,468,405 B2
(45) Date of Patent: Dec. 23, 2008

(54) INCREASE IN THE MELTING POINT AND THE ENTHALPY OF MELTING OF POLYAMIDES BY A WATER TREATMENT

(75) Inventors: Jean-Philippe Allen, Irigny (FR); Philippe Blondel, Bernay (FR); Patrick Douais, Le Noyer en Ouche (FR)

(73) Assignee: Atofina, Puteaux (FR)

( * ) Notice: Subject to any disclaimer, the term of this patent is extended or adjusted under 35 U.S.C. 154(b) by 410 days.

(21) Appl. No.: 10/689,840

(22) Filed: Oct. 22, 2003

(65) Prior Publication Data

US 2004/0138344 A1    Jul. 15, 2004

Related U.S. Application Data

(60) Provisional application No. 60/425,319, filed on Nov. 12, 2002.

(30) Foreign Application Priority Data

Oct. 23, 2002    (FR) .................. 02 13219

(51) Int. Cl.
*C08F 6/24* (2006.01)
*C08F 6/00* (2006.01)
*C08J 3/28* (2006.01)

(52) U.S. Cl. .................. 523/328; 528/499; 528/503
(58) Field of Classification Search ................ 523/326; 528/499, 503, 328
See application file for complete search history.

(56) References Cited

U.S. PATENT DOCUMENTS

| 2,728,737 | A | * | 12/1955 | Wittcoff .................... 544/107 |
| 2,742,440 | A | * | 4/1956 | Stott et al. ................. 521/49.8 |
| 3,019,210 | A | * | 1/1962 | Gilles ........................ 523/204 |
| 3,335,115 | A | * | 8/1967 | Ludewig .................... 528/493 |
| 3,423,183 | A |   | 1/1969 | Quetzke |
| 3,446,782 | A | * | 5/1969 | Masaru et al. .............. 528/323 |
| 3,679,638 | A | * | 7/1972 | Wolfgang et al. ........... 528/486 |
| 3,844,991 | A | * | 10/1974 | Ferraro et al. ............... 523/307 |
| 4,051,113 | A |   | 9/1977 | Kissel et al. |
| 4,195,162 | A | * | 3/1980 | Feldmann et al. ........... 528/313 |
| 4,334,056 | A | * | 6/1982 | Meyer et al. ................ 528/496 |
| 4,687,837 | A | * | 8/1987 | Mumcu ...................... 528/496 |
| 4,945,152 | A | * | 7/1990 | Peerlkamp .................. 528/335 |
| 5,025,043 | A | * | 6/1991 | Smith ........................ 523/326 |
| 5,723,538 | A | * | 3/1998 | Fischer et al. ............... 524/608 |
| 5,932,687 | A | * | 8/1999 | Baumann et al. ............ 528/313 |
| 6,245,281 | B1 |   | 6/2001 | Scholten et al. |

FOREIGN PATENT DOCUMENTS

| EP | 0911142 |   | 4/1999 |
| FR | 1518775 |   | 3/1968 |
| FR | 2197922 |   | 3/1974 |
| WO | WO99/10408 | * | 3/1999 |

OTHER PUBLICATIONS

Translation of Opponent's Remarks in EP Opposition to Corresponding European Patent 1413595, 2007.*
Translation of Patentee's Remarks in EP Opposition to Corresponding European Patent 1413595, 2007.*

* cited by examiner

*Primary Examiner*—Tae H Yoon
(74) *Attorney, Agent, or Firm*—Millen, White, Zelano, Branigan, P.C.

(57) ABSTRACT

A method for increasing at least one of the following two parameters of a polyamide: (I) its melting point and (ii) its enthalpy of melting $\Delta H_m$, in which:
  this polyamide is brought into contact in the solid state with water or with steam at a temperature close to its crystallization temperature $T_c$ for a time long enough to effect this increase;
  then, the water (or steam) is separated from the polyamide and the polyamide is dried.

8 Claims, No Drawings

INCREASE IN THE MELTING POINT AND THE ENTHALPY OF MELTING OF POLYAMIDES BY A WATER TREATMENT

This application claims the priority of U.S. Provisional application No. 60/425,319, filed Nov. 12, 2002.

FIELD OF THE INVENTION

The present invention relates to the increase in the melting point and in the enthalpy of melting of polyamides by a water treatment. This method makes it possible to increase the melting point $T_m$ and the enthalpy of melting of polyamides without appreciably modifying the crystallization temperature $T_c$ (also called the solidification temperature). These properties of polyamides are useful in many applications and in particular in the technology of polyamide powder sintering by melting using radiation such as, for example, a laser beam (laser sintering).

THE PRIOR ART AND THE TECHNICAL PROBLEM

The technology of sintering polyamide powders by a laser beam is used to manufacture objects in three dimensions, such as prototypes and models. A thin layer of polyamide powder is deposited on a horizontal plate held in a chamber heated to a temperature of between the crystallization temperature $T_c$ and the melting point $T_m$ of the polyamide powder. The laser sinters powder particles at various points in the powder layer according to a geometry corresponding to the object, for example with the aid of a computer that has the shape of the object stored in memory and reconstructs it in the form of slices. Next, the horizontal plate is lowered by a value corresponding to the thickness of a layer of powder (for example between 0.05 and 2 mm and generally around 0.1 mm), then a new layer of powder is deposited and the laser sinters powder particles according to a geometry according to this new slice of the object. The procedure is repeated until the entire object has been manufactured. A block of powder containing within it the object is obtained. Those parts that have not been sintered therefore remain in the powder state. Next, the whole assembly is gently cooled and the object solidifies as soon as its temperature falls below the crystallization temperature $T_c$. After complete cooling the object is separated from the powder, which can be used again for another operation.

It is recommended that the powder have a difference $T_m-T_c$ as large as possible so as to avoid deformation (or curling) phenomena during manufacture. This is because at time to, immediately after the action of the laser beam, the temperature of the specimen is above the crystallization temperature ($T_c$) of the powder, but the addition of a colder new layer of powder causes the temperature of the part to rapidly fall below $T_c$ and induce deformations.

Moreover, an enthalpy of melting ($\Delta H_m$) as high as possible is required, so as to obtain good geometrical definition of the parts manufactured. This is because if the enthalpy of melting is too low, the energy supplied by the laser is sufficient to sinter, by thermal conduction, the powder particles close to the walls being constructed, and thus the geometrical precision of the part is no longer satisfactory.

It is clear that everything that has just been explained in respect of the sintering of polyamide powders using a laser beam is valid whatever the radiation that causes the melting.

U.S. Pat. No. 6,245,281 describes the use of nylon-12 (PA-12) powders in the technology of laser beam sintering of powders. These powders are such that their $T_m$ is between 185 and 189° C., their $T_c$ is between 138 and 143° C. and their $\Delta H_m$ is 112±17 J/g. These powders are manufactured according to the process disclosed in Patent DE 2 906 647 (=U.S. Pat. No. 4,334,056). In the latter patent, PA-12 is firstly manufactured, which is dissolved in ethanol between 130 and 150° C. and then gently cooled below 125° C. with stirring. The PA-12 precipitates in powder form.

A much simpler way of increasing the difference between $T_m$ and $T_c$ and the enthalpy of melting $\Delta H_m$ of a polyamide has now been found—all that is required is to bring this polyamide in the solid state into contact with water or with steam at a temperature close to its crystallization temperature $T_c$ for a long enough time, which is in general between a few hours and 100 hours. The crystallization temperature is not modified (or only slightly) by this treatment. It is possible to carry out this treatment on polyamide powder or on polyamide granules. The granules may then be ground to make powder. The advantage of carrying out this treatment on powders is that the powder is manufactured according to a chosen particle size or particle size distribution, and then the water treatment is carried out in order to obtain the desired characteristics in terms of the difference between $T_m$ and $T_c$ and a sufficiently high $\Delta H_m$ value. In the method of the prior art, it is difficult for both the stirring and the cooling to be adjusted simultaneously. In addition, there is a risk of combustion when using hot ethanol.

BRIEF DESCRIPTION OF THE INVENTION

The present invention relates to a method for increasing at least one of the following two parameters of a polyamide: (i) its melting point and (ii) its enthalpy of melting $\Delta H_m$, in which:

this polyamide is brought into contact in the solid state with water or with steam at a temperature close to its crystallization temperature $T_c$ for a time long enough to effect this increase;

then, the water (or steam) is separated from the polyamide and the polyamide is dried.

The polyamide may be a homopolyamide or a copolyamide. It may be a blend of a polyamide and of at least one other polymer, the polyamide forming the matrix and the other polymer or polymers forming the dispersed phase.

Advantageously, the polyamide is in divided form, such as powder or granules. The granules thus treated may then be ground in order to make powders.

The water or steam treatment of the invention may also be preceded by a conventional methanol treatment in order to extract any oligomers contained in the polyamide.

According to another form of the invention, the water or steam may contain methanol; thus, oligomers or impurities contained in the polyamide to be treated may be extracted simultaneously. It is recommended in this form of the invention to rinse the polyamide before drying it, in order to completely remove any trace of methanol.

The present invention also relates to a process for manufacturing polyamide objects by the sintering of polyamide powders by melting them using radiation, the powders having been treated according to the above-mentioned method or resulting from the grinding of granules treated according to the abovementioned method. As an example of radiation, mention may be made of that provided by a laser beam (the process is then called laser sintering). Mention may also be made of the process in which a mask is placed between the powder layer and the radiation source, the powder particles protected from the radiation by the mask not being sintered.

DETAILED DESCRIPTION OF THE INVENTION

With regard to polyamides, the term "polyamide" is understood to mean products resulting from the condensation:

- of one or more amino acids, such as aminocaproic, 7-aminoheptanoic, 11-aminoundecanoic and 12-aminododecanoic acids or of one or more lactams, such as caprolactam, oenantholactam and lauryllactam;
- of one or more salts or mixtures of diamines, such as hexamethylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecanedicarboxylic acids.

By way of examples of polyamides, mention may be made of PA-6, PA-6,6, PA-11 and PA-12.

It is also possible to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid. Mention may also be made of copolyamides resulting from the condensation of an aliphatic diamine with an aliphatic dicarboxylic acid and at least one other monomer chosen from aliphatic diamines other than the previous one and aliphatic diacids other than the previous one.

By way of examples of lactams, mention may be made of those having from 3 to 12 carbon atoms in the main ring and possibly being substituted. Mention may be made, for example, of β,β-dimethylpropriolactam, α,α-dimethylpropriolactam, amylolactam, caprolactam, capryllactam and lauryllactam.

By way of examples of alpha, omega-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine may be an aliphatic diamine having from 6 to 12 atoms or it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12) and copolymers of lauryllactam, azelaic acid and hexamethylenediamine (PA-6,9/12).

It is possible to use polyamide blends. These are, for example, blends of aliphatic polyamides and semi-aromatic polyamides, and blends of aliphatic polyamides and cycloaliphatic polyamides.

Mention may be made, for example, of the transparent compositions disclosed in Patent Application EP 1 227 131, which comprise by weight, the total being 100%:

5 to 40% of an amorphous polyamide (B) which results essentially from the condensation:
  either of at least one diamine chosen from cycloaliphatic diamines and aliphatic diamines and of at least one diacid chosen from cycloaliphatic diacids and aliphatic diacids, at least one of these diamine or diacid units being cycloaliphatic,
  or a cycloaliphatic alpha, omega-aminocarboxylic acid,
  or a combination of these two possibilities,
  and optionally of at least one monomer chosen from alpha, omega-aminocarboxylic acids or the possible corresponding lactams, aliphatic diacids and aliphatic diamines;
0 to 40% of a soft polyamide (C) chosen from copolymers having polyamide blocks and polyether blocks, and copolyamides;
0 to 20% of a compatibilizer (D) for (A) and (B);
0 to 40% of a soft modifier (M);
with the condition that (C)+(D)+(M) is between 0 and 50%, the balance to 100% of a semicrystalline polyamide (A).

Mention may also be made of the transparent compositions disclosed in Patent Application EP 1 227 132 which comprise, by weight, the total being 100%:

5 to 40% of an amorphous polyamide (B) which essentially results from the condensation of at least one possibly cycloaliphatic diamine, of at least one aromatic diacid and possibly at least one monomer chosen from:
  alpha, omega-aminocarboxylic acids,
  aliphatic diacids,
  aliphatic diamines;
0 to 40% of a soft polyamide (C) chosen from copolymers having polyamide blocks and polyether blocks, and copolyamides;
0 to 20% of a compatibilizer (D) for (A) and (B);
(C)+(D) is between 2 and 50%;
with the condition that (B)+(C)+(D) is not less than 30%, the balance to 100% of a semicrystalline polyamide (A).

It would not be outside the scope of the invention to replace some of the polyamide with a copolymer having polyamide blocks and polyether blocks, that is to say by using a blend comprising at least one of the above polyamides and at least one copolymer having polyamide blocks and polyether blocks.

The copolymers having polyamide blocks and polyether blocks result from the copolycondensation of polyamide blocks having reactive ends with polyether blocks having reactive ends, such as, inter alia:

1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;
3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

The polyether may, for example, be a polytetramethylene glycol (PTMG). The latter is also called polytetrahydrofuran (PTHF).

The number-average molar mass $\overline{M}_n$ of the polyamide blocks is between 300 and 15 000 and preferably between 600 and 5 000. The mass $\overline{M}_n$ of the polyether blocks is between 100 and 6 000 and preferably between 200 and 3 000.

Polymers having polyamide blocks and polyether blocks may also include randomly distributed units. These polymers may be prepared by the simultaneous reaction of the polyether and polyamide-block precursors.

For example, it is possible to react polyetherdiol, a lactam (or an alpha,omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into diamine polyethers and condensed with polyamide blocks having carboxylic ends. They may also be mixed with polyamide precursors and a chain stopper in order to make polyamide-block polyether-block polymers having randomly distributed units.

Polymers having polyamide and polyether blocks are described in U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The ratio of the amount of copolymer having polyamide blocks and polyether blocks to the amount of polyamide may be, by weight, between 1/99 and 15/85.

With regard to the blend of a polyamide and at least one other polymer, this is in the form of a blend having a polyamide matrix, the other polymer or polymers forming the dispersed phase. As examples of this other polymer, mention may be made of polyolefins, polyesters, polycarbonate, PPO (polyphenylene oxide), PPS (polyphenylene sulphide) and elastomers.

The polyamide, whether or not as a blend with at least one other polymer, may contain fillers, pigments, antioxidants and UV stabilizers, provided that during the water or steam treatment the polyamide is not impaired.

The process of the invention is particularly useful for polyamides chosen from PA-11, PA-12, aliphatic polyamides resulting from the condensation of an aliphatic diamine having from 6 to 12 carbon atoms and an aliphatic diacid having from 9 to 12 carbon atoms, and 11/12 copolyamides having either more than 90% of nylon-11 units or more than 90% of nylon-12 units.

As examples of aliphatic polyamides resulting from the condensation of an aliphatic diamine having from 6 to 12 carbon atoms and an aliphatic diacid having from 9 to 12 carbon atoms, mention may be made of:

PA-6,12, resulting from the condensation of hexamethylenediamine and 1,12-dodecanedioic acid;
PA-9,12, resulting from the condensation of the Cg diamine and 1,12-dodecanedioic acid;
PA-10,10, resulting from the condensation of the $C_{10}$ diamine and 1,10-decanedioic acid; and
PA-10,12, resulting from the condensation of the Cg diamine and 1,12-dodecanedioic acid.

As regards the 11/12 copolyamides having either more than 90% of nylon-11 units or more than 90% of nylon-12 units, these result from the condensation of 1-aminoundecanoic acid with lauryllactam (or the $C_{12}$ α, ω-amino acid).

Advantageously, the polyamide contains an organic or mineral catalyst which has been added during the polycondensation. Preferably, this is phosphoric or hypophosphoric acid. The amount of catalyst may be up to 3000 ppm, and advantageously between 50 and 1000 ppm, relative to the amount of polyamide.

It would not be outside the scope of the invention to use a polyamide blend.

With regard to the granules and powders, the granules may be particles of a few mm to 1 cm in size. For example, they are those obtained as output by an extruder. As regards the powders, these may be of different size. For example, the powders useful in the laser sintering process may have a size up to 350 µm and advantageously are of a size between 10 and 100 µm. Preferably, the $D_{50}$ is 60 µm (that is to say 50% of the particles have a size of less than 60 µm).

With regard to the water or steam treatment, the $T_m$ and the $\Delta H_m$ are usually increased simultaneously. It should also be noted that the $T_c$ is not modified (or only slightly)—this possible modification is at most a few ° C. (for example 1 to 3° C.).

Regarding the temperature, the expression "close to the $T_c$ of the polyamide" means a temperature within a range between 10° C. below $T_c$ and 10° C. above $T_c$. Preferably, the temperature lies within a range between 5° C. below $T_c$ and 5° C. above $T_c$. For example, in the case of PA-11 it is between 150 and 160° C.

The duration of the treatment may vary depending on the nature of the PAs and their physical state (powder, granules or coarser parts), however it has been noted that there is already a substantial increase in $T_m$ and/or $\Delta H_m$ after a few hours. To obtain the full effect of the treatment, it has been noted that the duration is between 5 and 100 hours. This treatment makes it possible to increase the melting point of the PAs by 10 to 15° C. and to obtain enthalpies of melting of, for example, about 100 to 110 J/g. Such a heat treatment of polyamide powders in water or steam allows the molecular chains to be rearranged, increasing the melting point and the associated enthalpy. These values are obtained by standard methods such as DSC (differential scanning calorimetry). Thus, a PA-11 powder having the following characteristics before treatment:

$T_m$ between 185 and 190° C.,
$T_c$ between 150 and 160° C.,
$\Delta H_m$ equal to 80±5 J/g, becomes one with the following characteristics after treatment:

$T_m$ between 195 and 205° C.,
$T_c$ between 150 and 160° C.,
$\Delta H_m$ equal to 100±5 J/g.

The treatment may be carried out in any contacting device. For example, the polyamide is introduced into a pressureresistant container and then water or steam or water then steam, or only water, is introduced into it and heated by means of a resistance heating element or of a jacket containing a heating fluid, or any equivalent device. These techniques are known per se. A person skilled in the art may easily determine the pressure according to the temperature of the water or steam.

The treatment may be carried out at a pressure above the pressure corresponding to the temperature of water by introducing, for example, nitrogen in the contacting device. The pressure may have an effect on the increasing of the melting point.

After the treatment, all that is required is to separate the polyamide from the water or steam by any means, and then dry it. These techniques are known per se.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosure [s] of all applications, patents and publications, cited herein and of corresponding French application No. 02. 13219, filed Oct. 23, 2002, and U.S. Provisional Application Ser. No. 60/425,319, filed Nov. 12, 2002, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for increasing at least one of the following two parameters of a polyamide: (i) melting point and (ii) enthalpy of melting $\Delta H_m$, comprising:

contacting solid granular or powdered polyamide with a substance consisting of water, water containing methanol, or steam, at a temperature close to crystallization temperature $T_c$ of the polyamide, for a time long enough to effect said increase;

separating water or steam from the polyamide and drying the polyamide.

2. The method according to claim 1, in which the temperature close to crystallization temperature $T_c$ is from 10° C. below $T_c$ to 10° C. above $T_c$.

3. The method according to claim 1, in which the temperature close to crystallization temperature $T_c$ is from 5° C. below $T_c$ to 5° C. above $T_c$.

4. The method according to claim 1, in which the duration of treatment is 5 to 100 hours.

5. The method according to claim 1, in which the polyamide is PA-11, PA-12, an aliphatic polyamides resulting from the condensation of an aliphatic diamine having from 6 to 12 carbon atoms and an aliphatic diacid having from 9 to 12 carbon atoms, or an 11/12 copolyamide having either more than 90% of nylon-11 units or more than 90% of nylon-12 units.

6. The method according to claim 1, in which the polyamide in the form of granules or powder is ground, if in the form of granules, and further melted and sintered to form an object.

7. A method according to claim 1, wherein the polyamide is blended with an additional polymer and optionally contains a filler.

8. A process for manufacturing polyamide objects, comprising increasing melting point, enthalpy of melting $\Delta H_m$, or both in polyamide, by contacting solid granular or powdered polyamide with a substance consisting of water, water containing methanol or steam, at a temperature close to crystallization temperature $T_c$ of the polyamide, for a time long enough to effect said increase;

separating water or steam from the polyamide and drying the polyamide, optionally grinding the polyamide to a powder, and sintering by melting using radiation.

* * * * *

UNITED STATES PATENT AND TRADEMARK OFFICE
CERTIFICATE OF CORRECTION

PATENT NO. : 7,468,405 B2  Page 1 of 1
APPLICATION NO. : 10/689840
DATED : December 23, 2008
INVENTOR(S) : Jean-Philippe Allen It is certified that error appears in the above-identified patent and that said Letters Patent is hereby corrected as shown below:

Column 8, line 17, reads "an aliphatic polyamides" should read -- an aliphatic polyamide --

Signed and Sealed this

Twenty-fifth Day of August, 2009

David J. Kappos
*Director of the United States Patent and Trademark Office*